US008182775B2

United States Patent
England

(10) Patent No.: US 8,182,775 B2
(45) Date of Patent: May 22, 2012

(54) DRY-SCRUBBING MEDIA COMPOSITIONS AND METHODS OF PRODUCTION AND USE

(75) Inventor: William G. England, Suwanee, GA (US)

(73) Assignee: Purafil, Inc., Doraville, GA (US)

( * ) Notice: Subject to any disclaimer, the term of this patent is extended or adjusted under 35 U.S.C. 154(b) by 1064 days.

(21) Appl. No.: 11/948,116

(22) Filed: Nov. 30, 2007

(65) Prior Publication Data

US 2008/0127822 A1    Jun. 5, 2008

Related U.S. Application Data

(60) Provisional application No. 60/867,924, filed on Nov. 30, 2006.

(51) Int. Cl.
| | |
|---|---|
| *C09K 3/00* | (2006.01) |
| *B01D 53/46* | (2006.01) |
| *B01D 53/50* | (2006.01) |
| *B01D 53/52* | (2006.01) |
| *B01D 53/56* | (2006.01) |
| *B01D 53/62* | (2006.01) |
| *B01D 53/68* | (2006.01) |

(52) U.S. Cl. ............. 423/210; 95/116; 95/129; 95/131; 95/132; 95/136; 95/137; 95/139; 422/177; 423/221; 423/230; 423/239.1; 423/240 S; 423/241; 423/244.08

(58) Field of Classification Search ............. 423/244.01, 423/244.07, 244.03, 210, 221, 230, 239, 423/240 S, 241, 244.08; 252/182.35; 95/116, 95/129, 131, 132, 136, 137, 139
See application file for complete search history.

(56) References Cited

U.S. PATENT DOCUMENTS

| | | | |
|---|---|---|---|
| 2,967,587 A | | 1/1961 | Steding et al. |
| 3,049,399 A | | 8/1962 | Gamson et al. |
| 3,226,332 A | | 12/1965 | Lincoln et al. |
| 3,360,134 A | | 12/1967 | Pullen |
| 3,391,988 A | | 7/1968 | Friess et al. |
| 3,764,653 A | * | 10/1973 | Urban ................. 423/244.04 |
| 3,819,532 A | | 6/1974 | Cracknell et al. |
| 3,842,014 A | | 10/1974 | Friend et al. |
| 4,002,720 A | | 1/1977 | Wheelock et al. |
| 4,072,479 A | | 2/1978 | Sinha et al. |

(Continued)

FOREIGN PATENT DOCUMENTS

CN         101588855 A         11/2009

(Continued)

OTHER PUBLICATIONS

Mar. 26, 2008, International Search Report.

(Continued)

*Primary Examiner* — Wayne Langel
(74) *Attorney, Agent, or Firm* — Kilpatrick Townsend & Stockton LLP

(57) ABSTRACT

Dry-scrubbing media compositions, methods of preparing same, and methods of use are provided. The compositions contain activated alumina and potassium carbonate. Optionally, activated carbon and other impregnates, such as sulfates of group 1A metals, are included in the compositions. The compositions exhibit improved efficiency and capacity for the removal of compounds such as chlorine or sulfur dioxide from an air-stream. The compositions are particularly useful for reducing or preventing the release of toxic gaseous compounds from the areas such as petroleum storage areas, refineries, drinking water systems, sewage treatment facilities, swimming pools, hospital morgues, animal rooms, and pulp and paper production sites.

17 Claims, 3 Drawing Sheets

U.S. PATENT DOCUMENTS

| | | |
|---|---|---|
| 4,072,480 A | 2/1978 | Wagner |
| 4,113,839 A | 9/1978 | Maki et al. |
| 4,215,096 A | 7/1980 | Sinha et al. |
| 4,273,751 A | 6/1981 | Sinha et al. |
| 4,323,544 A | 4/1982 | Magder |
| 4,855,117 A | 8/1989 | Deschamps et al. |
| 4,855,276 A | 8/1989 | Osborne et al. |
| 5,288,306 A | 2/1994 | Aibe et al. |
| 5,376,609 A | 12/1994 | Guile |
| 5,403,548 A | 4/1995 | Aibe et al. |
| 5,779,767 A | 7/1998 | Golden et al. |
| 5,914,294 A | 6/1999 | Park et al. |
| 6,146,606 A | 11/2000 | Atobe et al. |
| 6,171,372 B1 | 1/2001 | Ichiki et al. |
| 6,372,289 B1 | 4/2002 | Hickman |
| 6,897,182 B2 | 5/2005 | Cutler et al. |
| 7,377,963 B2 | 5/2008 | Tanahashi et al. |
| 2003/0180213 A1 | 9/2003 | Carnes et al. |
| 2008/0236389 A1 | 10/2008 | Leedy et al. |
| 2009/0246107 A1 | 10/2009 | England |

FOREIGN PATENT DOCUMENTS

| | | |
|---|---|---|
| EP | 1094032 | 4/2001 |
| EP | 1417995 A1 | 5/2004 |
| EP | 2 125 159 A1 | 12/2009 |
| WO | WO-02064703 | 8/2002 |
| WO | WO-2005070534 | 8/2005 |
| WO | WO 2008/067521 A1 | 6/2008 |
| WO | WO-2009120744 A1 | 10/2009 |

OTHER PUBLICATIONS

International Application Serial No. PCT/US2009/038185, International Search Report and Written Opinion mailed Aug. 19, 2009.

International Application Serial No. PCT/US2009/038185, International Preliminary Report on Patentability mailed Oct. 7, 2010.

Chinese Application No. 2007800441426, Office Action mailed on Mar. 16, 2011, 9 Pages.

International Application No. PCT/US2007/086046, International Preliminary Report on Patentability mailed on Jun. 11, 2009, 14 Pages.

International Application No. PCT/US2007/086046, International Search Report and Written Opinion mailed on Mar. 26, 2008, 17 Pages.

* cited by examiner

DRY-SCRUBBING MEDIA COMPOSITIONS AND METHODS OF PRODUCTION AND USE

CROSS REFERENCE TO RELATED APPLICATIONS

This application claims the benefit of priority to U.S. Provisional Application No. 60/867,924, filed Nov. 30, 2006, the disclosure of which is incorporated herein in its entirety by reference.

FIELD OF THE INVENTION

The invention relates to compositions and methods for the removal of toxic, corrosive, harmful or malodorous compounds from an air-stream. The invention more particularly relates to the use of a dry-scrubbing media containing a mixture of activated alumina and potassium carbonate.

BACKGROUND OF THE INVENTION

Undesirable airborne compounds, including chlorine and sulfur containing compounds, ammonia, formaldehyde, urea, carbon monoxide, oxides of nitrogen, mercaptans, amines, and ethylene, occur in a number of environments, where most primarily are responsible for the presence of disagreeable odors, irritating or toxic gases. Such environments include petroleum storage areas, refineries, water treatment facilities, sewage treatment facilities, hospital morgues, animal rooms, swimming pools, and pulp and paper production sites, among others.

Facilities storing hazardous quantities of chlorine or sulfur dioxide must invest in emergency standby equipment to prevent accidental chemical releases. The Environmental Protection Agency's EPA's) Risk Management Program for Chemical Accident Release Prevention "requires regulated facilities to develop and implement appropriate risk management programs to minimize the frequency and severity of chemical plant accidents." In addition, "a performance-based approach towards compliance with the risk management program rule is required."

The Uniform Fire Code, Article 80, states that the full contents of the single largest storage container of chlorine must be mitigated in 30 minutes. If a toxic gas release were to occur from a 1-ton cylinder of chlorine, the laws of thermodynamics suggest that approximately 400 lbs of liquid chlorine would flash into vapor and the remaining contents of the chlorine cylinder would spill out as a liquid at its boiling point. According to American Water Works Association (AWWA) Risk Management Program Guidance, the outer limit of the impact area in a chlorine release, is drawn at a five-mile radius in all directions from the point of impact.

Chlorine ($Cl_2$) is a greenish-yellow dense gas with a suffocating odor. The compound is used for bleaching fabrics, purifying water, treating iron, and other uses. Control of this powerful irritant is most desirable for the well-being of those who work with it or are otherwise exposed to it. At lower levels, in combination with moisture, chlorine has a corrosive effect on electronic circuitry, stainless steel and the like. Accordingly, protecting electronic apparatus from the corrosive fumes of chlorine and chlorine by-products is desirable.

Sulfur dioxide ($SO_2$) is a colourless gas. It can be oxidized to sulfur trioxide, which in the presence of water vapour is readily transformed to sulphuric acid mist. Health effects caused by exposure to high levels of $SO_2$ include breathing problems, respiratory illness, changes in lung defenses, worsening respiratory and cardiovascular disease. People with asthma, chronic lung or heart disease are the most sensitive. $SO_2$ also damages trees and crops. $SO_2$, along with nitrogen oxides, are the main precursors of acid rain. This contributes to the acidification of lakes and streams, accelerated corrosion of buildings and reduced visibility.

Hydrogen sulfide ($H_2S$), a colorless, toxic gas with a characteristic odor of rotten eggs, is produced in coal pits, gas wells, sulfur springs, and from decaying organic matter containing sulfur. Controlling emissions of this gas, particularly from municipal sewage treatment plants, has long been considered desirable. More recently, protecting electronic apparatus from the corrosive fumes of these compounds has become increasingly important. $H_2S$ is also flammable.

Ammonia ($NH_3$), also a colorless gas, possesses a distinctive, pungent odor and is a corrosive, alkaline gas. The gas is produced in animal rooms and nurseries and its control also has long been considered desirable.

Formaldehyde (HCHO) is a colorless gas with a pungent suffocating odor. It is present in hospital morgues, and because it is intensely irritating to mucous membranes, its control is desirable.

Urea ($CH_4N_2O$) is present in toilet exhaust and is used extensively in the paper industry to soften cellulose. Its odor makes control of this compound desirable.

Carbon monoxide (CO), an odorless, colorless, toxic gas, is present in compressed breathing air. Oxygenation requirements for certain atmospheres, including those inhabited by humans, mandate its control.

Oxides of nitrogen, including nitrogen dioxide ($NO_2$) nitric oxide (NO), and nitrous oxide ($N_2O$), are compounds with differing characteristics and levels of danger to humans, with nitrous oxide being the least irritating oxide. Nitrogen dioxide, however, is a deadly poison. Control of pollution resulting from any of these oxides is desirable or necessary, depending on the oxide.

Mercaptans and amines, including methyl mercaptan ($CH_3SH$), butyl mercaptan ($C_4H_9SH$) and methyl amine ($CH_5N$), are undesirable gases present in sewerage odor. The control of these gases is desired for odor control.

Ethylene ($C_2H_4$) is a colorless, flammable gas that is a simple asphyxiant which accelerates the maturation or decomposition of fruits, vegetables, and flowers. Control of this compound prolongs the marketable life of such items.

Attempts have been made to provide a solid filtration media for removing the undesirable compounds described above. Desired features of such media are a high total adsorption capacity for the targeted compound, high efficiency in removing the compound from an air or gas stream, and a low ignition temperature (non-flammability). For example, U.S. Pat. No. 3,049,399 describes a solid oxidizing system in pellet form composed of activated alumina, $Al_2O_3$, impregnated with potassium permanganate, $KMnO_4$. This pellet provides air purification and odor control by both adsorbing and adsorbing odors, and then destroying the collected odors by the potassium permanganate's controlled oxidizing action.

Activated carbon will physically adsorb considerable quantities of hydrogen sulfide. See, for example, U.S. Pat. No. 2,967,587. See also French Patent No. 1,443,080, which describes adsorption of hydrogen sulfide directly by activated carbon, which is then regenerated by hot inert gas or superheated steam.

Better removal of sulfur compounds can be accomplished by the catalysis of the oxidation of hydrogen sulfide to sulfur, based on the ability of carbon to oxidize hydrogen sulfide to elemental sulfur in the presence of oxygen. Ammonia may be added to an influent gas stream of hydrogen sulfide and oxygen to provide catalysis. Silicate-impregnated activated carbon is also effective. The residual adsorbate, however, may not be removed by extraction with alkaline solutions. See South African Patent No. 70/4611. Treatment with a 1% solution of NaOH restores the adsorption capacity of activated carbons used for adsorption removal of hydrogen sulfide gas. Boki, Shikoku Igaku Zasshi, 30(c), 121-8 (1974) (Chemical Abstracts, Vol. 81).

See also, for example, French Patent No. 1,388,453, which describes activated carbon granules impregnated with 1% iodine ($I_2$) for this use. South African Patent No. 70/4611 discloses the use of silicate-impregnated activated carbon. Swinarski et al, Chem. Stosowana, Ser. A 9(3), 287-94 (1965), (Chemical Abstracts, Vol. 64, 1379c), describe the use of activated carbon treated with potassium salts, including potassium hydroxide (KOH) for hydrogen sulfide adsorption. Activated carbon has also been impregnated with a solution of sodium hydroxide (NaOH) and potassium iodide (KI).

In U.S. Pat. No. 3,391,988, mercaptans are removed from exhaust gas by contact with an adsorbent impregnated with a liquid mixture of an alkaline material. Subsequent patents have taught different treatments of activated carbon with NaOH and, optionally, lead acetate (PbOAc), and have indicated the influence of the chemical reaction therein combined with the physical adsorption of the activated carbon. See U.S. Pat. Nos. 4,072,479 and 4,072,480. Although not confirmed, U.S. Pat. No. 4,072,479 suggests that hydrogen sulfide is oxidized to elemental sulfur in the presence of activated carbon, and that the presence of moisture on the activated carbon is significant. Another method for removing sulfur and other compounds from gas streams utilizes a product known as Purakol K (Lindair, Ljusne, Sweden). This product contains carbon impregnated with NaOH and KI.

Other uses of impregnated carbon include removing water from air (desiccation), see, for example, Soviet Union Patent No. 1,219,122 (activated carbon combined with aluminum oxide; a binder, calcium hydroxide; and lithium bromide); and the removal of acidic contaminants from gas streams, see, for example, U.S. Pat. No. 4,215,096 (activated carbon impregnated with sodium hydroxide and moisture, for the removal of chlorine from gas streams) and U.S. Pat. No. 4,273,751 (activated carbon impregnated with sodium hydroxide and moisture, for the removal of sulfur oxide gases and vapors from gas streams).

Japanese Patent No. 61-178809 teaches water purification by treatment with activated carbon loaded with metallic copper or copper salts. Several patents teach alumina and carbon adsorbents, including U.S. Pat. No. 3,360,134 (alumina hydrate contacted with a carbonaceous solution; used as a decolorizing agent, a reviving agent for precious metal electroplating bath for the removal of constituents from cigarette smoke, and as an adsorbent in pressure or gravity flow percolation beds); U.S. Pat. No. 4,449,208 (powdered carbon, dense alumina, and a binder, for increasing heat capacity of the adsorbent to enhance the operation of adiabatic pressure swing adsorption processes by decreasing the cyclic temperature change in the adsorbent bed during each cycle of the process); U.S. Pat. No. 3,819,532 (ground graphite and finely divided alumina adsorbent, for removing aromatics, heterocyclics, sulfur compounds, and colored materials from lubricating oils); and U.S. Pat. No. 3,842,014 (ground graphite and alumina binder, for adsorbing paraffin). Such art generally teaches a substrate consisting primarily of activated carbon with a relatively small amount of alumina.

None of the compositions described to date have effectively solved problems surrounding the combustibility of activated carbon. This problem can be critical in installations such as nuclear power plants.

Furthermore, none of the methods available thus far have effectively addressed neutralization of large quantities of gases. Accordingly, there remains a need in the art for a composition having an enhanced capacity for chlorine and sulfur dioxide removal. Furthermore, there remains a need in the art for a composition that can operate at low atmospheric temperatures.

SUMMARY OF THE INVENTION

Compositions and methods are provided herein for the capture and neutralization of large quantities of toxic or harmful compounds in an air-stream. Typically, the toxic or harmful compounds are acid gases. In particular, the compositions and methods described herein effectively absorbing and adsorbing compounds such as, but not limited to, hydrogen sulfide, chlorine, carbon dioxide, nitrogen dioxide, fluorides and sulfur dioxide.

The compositions described herein are dry-scrubbing media containing activated alumina and potassium carbonate. The dry scrubbing media may optionally include powdered activated carbon. Additionally, the dry scrubbing media may be impregnated with other substances, such as sodium thiosulfate.

The dry-scrubbing media provided herein exhibits an enhanced capacity to adsorb undesired compounds at a higher efficiency than commercially available media. In addition, the incorporation of potassium carbonate imparts increased physical strength. Further, use of powdered activated carbon reduces production costs. In addition, the use of sodium thiosulfate as an impregnate facilitates chemical absorption of chlorine to the dry-scrubbing media, particularly at low atmospheric temperatures, resulting in additional cost-savings and mechanical considerations.

Granular carbon is used in conventional filtration system and is significantly more expensive than powdered carbon. Powdered carbon is a by-product of granular carbon production. However, powdered carbon is too fine and dusty for use in solid filter beds.

The composition provided herein may be used to treat, prevent, or filter the release of toxic compounds from at least the following locations: petroleum storage areas, refineries, water treatment systems, sewage treatment facilities, hospital morgues, animal rooms, swimming pools, and pulp and paper production sites.

The unexpected and surprising ability of the composition to absorb or adsorb large quantities of harmful or toxic gaseous compounds such as chlorine and sulfur dioxide addresses a long-felt, unfulfilled need in the art and provides an important health benefit for animals and the environment.

Therefore it is an object of the present invention to provide an efficient, inexpensive method for preventing or reducing the release of harmful or toxic gaseous compounds.

Another objective of the present invention is to provide an efficient, inexpensive method for filtering harmful, toxic or odorous compounds from an air or gas stream.

Yet another object of the present invention is to provide an adsorbent composition that combines and catalyzes or exceeds the individual adsorptive, deodorizing or filtering properties of activated alumina, potassium carbonate and, optionally, powdered activated carbon and sodium thiosulfate.

Still another object of the present invention is to provide an adsorbent composition that maintains its integrity at high temperature.

Yet another object of the present invention is to provide an adsorbent composition that is primarily non-flammable.

These and other objects, features and advantages of the present invention will become apparent after a review of the following detailed description of the disclosed embodiments and the appended claims.

DETAILED DESCRIPTION OF THE INVENTION

Figure 1:
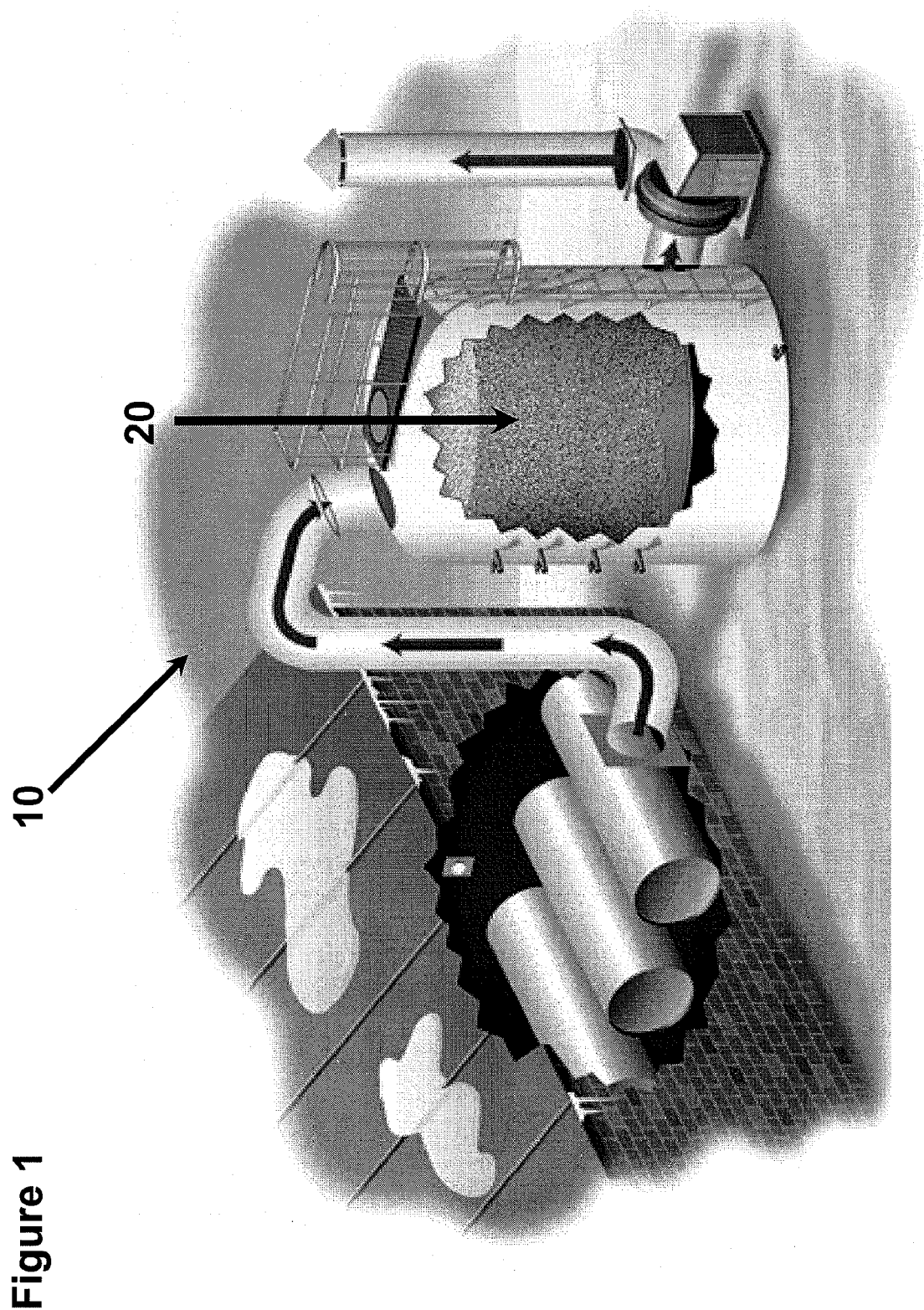
FIG. 1 is a schematic drawing of an emergency gas scrubber (EGS).

Dry-scrubbing media compositions and methods of production and use are provided herein. The dry-scrubbing media provides air purification and odor control by absorbing and adsorbing odors and then destroying the collected odors through chemical interaction on the surface of the dry-scrubbing media.

Dry-Scrubbing Media Compositions

The dry-scrubbing media composition described herein contains activated alumina and potassium carbonate. In one embodiment, the dry-scrubbing media further includes powdered activated carbon. In another embodiment, the dry-scrubbing media is impregnated with sodium thiosulfate.

The dry-scrubbing media compositions provided herein have an enhanced capacity for the adsorption of certain undesired compounds at a higher efficiency than currently available media. In addition, the dry-scrubbing media compositions described herein enjoy increased physical strength due to use of a carbonate such as, potassium carbonate. It has been unexpectedly discovered that the use of potassium carbonate in the dry-scrubbing media greatly increases chlorine removal capacity.

The addition of powdered activated carbon reduces production costs because powdered activated carbon is less expensive than granular carbon. Powdered carbon is a by-product of granular carbon production. Powdered carbon is not normally used in solid filtration system due to its fine and dusty characteristics. Additionally, the use of sodium thiosulfate as an impregnate in the present composition has been found to facilitate adsorption or absorption of chlorine at low atmospheric temperatures, resulting in additional cost-savings and mechanical considerations. The adsorbent dry-scrubbing media described herein requires a lower ignition temperature than conventional carbon compounds, which are classified as combustible solids. The filtration media art has for years generally pursued carbon and alumina adsorbent media as alternative media.

An activated alumina preferably employed in the present composition is manufactured by Engelhard Corporation, Iselin, N.J. or BASF Corporation, Florham Park, N.J. However, other acceptable, or suitable, activated alumina may be used. Suitable activated alumina is characterized as workable, or dehydrated with a loss on ignition (LOI) characteristic of preferably less than or equal to 20, and most preferably, an LOI of less than or equal to 10.

Powdered activated carbon may be used instead of granular activated carbon, and is preferred over granular activated carbon. Carbon black also may be used. Activated carbon, powdered carbon and carbon black are collectively referred to herein as "high surface area carbon." The size range of the powder is largely a matter of choice, although when producing pellets of dry-scrubbing media, some parameters are necessary for insuring that uniform pellets are achieved during rolling. In one embodiment, carbon is sized for passing 85% through a −325 mesh screen. In another embodiment, the carbon is sized for passing through a −50 mesh screen.

It has been noted that the rate of adsorption can vary upon the surface area of the activated carbon used. Accordingly, it is important to employ activated carbons having high surface areas, preferably between 500 and 2000 $m^2/g$ surface area, and most preferably between 1000-1200 $m^2/g$. An activated carbon preferably employed in the present composition is manufactured by NORIT Americas, Inc., Marshall, Tex. Other acceptable activated carbon may be used.

In embodiments that contain powdered activated carbon, it is preferred that the proportion of high surface area carbon be about 30% or more.

The potassium carbonate preferably employed in the present composition is available from Church & Dwight Co., Inc., Princeton, N.J. Other acceptable sources or manufacturers of potassium carbonate may be used.

Sodium thiosulfate is a colorless crystalline compound that is more familiar as the pentahydrate, $Na_2S_2O_3.5H_2O$, an efflorescent, monoclinic crystalline substance also called sodium hyposulfite or "hypo." Sodium thiosulfate is readily soluble in water and is a mild reducing agent. A sodium thiosulfate preferably employed in the present composition is available from Mallinckrodt Baker., Inc, Phillipsburg, N.J. Other acceptable sources or manufacturers of sodium thiosulfate may be used.

The impregnates used may be sulfates of Group 1A metals. In particular, the impregnate is sodium thiosulfate. While it is not clear how the impregnate functions in the dry-scrubbing media, it is believed that the impregnate reacts directly with the adsorbed undesired compound.

While not wishing to be bound by the following theory, it is believed that the dry-scrubbing media compositions provided herein utilize a chemisorptive process that removes chlorine and sulfur dioxide by means of absorption, adsorption and chemical reaction. Chlorine or sulfur dioxide are trapped within the dry-scrubbing media where an irreversible chemical reaction takes place, changing the gas into harmless solids. The chemical reaction occurs on the surface of the dry-scrubbing media. Additionally, the dry-scrubbing media may be housed in an apparatus designed to allow a reaction front to move down a dry-scrubbing media-packed column as chlorine release proceeds. This feature allows for partial releases to consume only a proportional amount of the media. Accordingly, the dry-scrubbing media composition provides substantial cost-savings in terms of usage and replacement materials.

Figure 2:
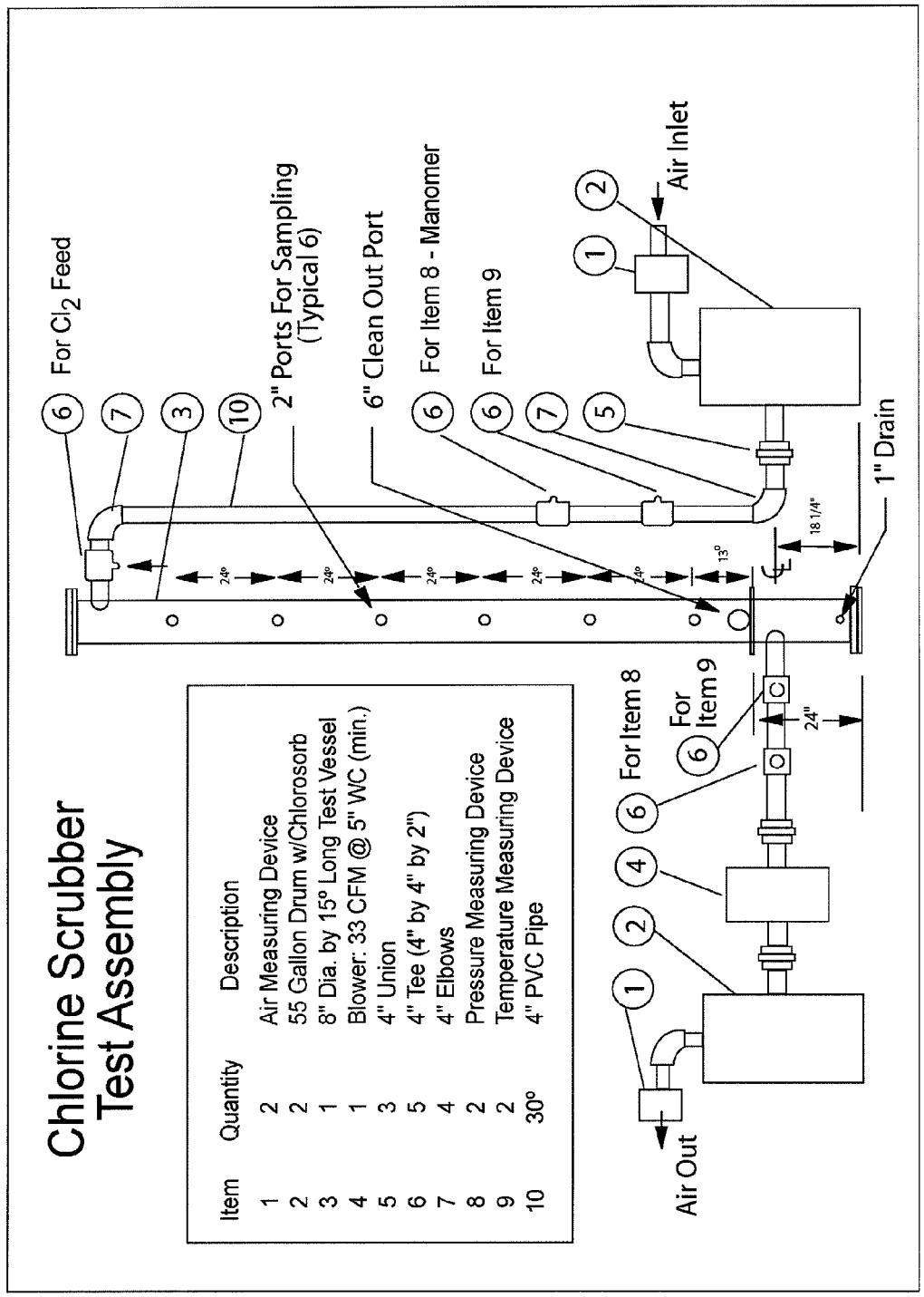
FIG. 2 is a detailed analytical drawing of a test prototype of a dry scrubber.

In one embodiment, an apparatus housing the dry-scrubbing media is termed an Emergency Gas Scrubber (EGS) 10 as shown in FIG. 1. A schematic drawing of a EGS system containing dry-scrubbing media 20 is also shown in FIG. 1. An initial small-scale prototype of an EGS was assembled as shown in FIG. 2. The EGS in FIG. 2 includes the dry-scrubbing media described herein contained within a reaction chamber or column. The EGS is designed to remove the entire contents of a fully loaded $Cl_2$ or $SO_2$ cylinder in a worst-case release scenario. More specifically, the EGS is designed to neutralize an initial 400 lbs of chlorine released in the first minute of a chemical spill and the remaining contents at 78 lbs/min thereafter, which exceeds the requirements of the Uniform Fire Code and surpasses systems currently available.

Instead of using toxic liquids (wet-scrubbers) to neutralize gases, the EGS uses a dry-scrubbing media 20. In one embodiment the dry-scrubbing media is prepared in pellet form. The pellets may be loaded into a reaction chamber, filter bed or column for use within the apparatus 10. In an alternative embodiment, the dry-scrubbing media is prepared via extrusion to form a matrix or honeycomb structure containing multiple channels that pass through the length of the extruded dry-scrubbing media 30. One advantage of dry-scrubbing media prepared via extrusion is that the matrix or honeycomb structure produced provides a significant surface area for chemical reactions to take place between contaminants, such as chlorine and sulfur dioxide, and the dry-scrubbing media as the air-stream passes through the matrix structure. The dry-scrubbing media's chemisorptive process removes $Cl_2$ and $SO_2$ by means of adsorption, absorption and chemical reaction. In one embodiment $Cl_2$ and $SO_2$ are trapped within dry-scrubbing media pellets where an irreversible chemical reaction changes the gases into harmless solids. The chemical reaction occurs on the surface of the dry-scrubbing media pellets throughout the volume of the pellets. In the event of exposure to chlorine or sulfur dioxide, a reaction front moves down the dry-scrubbing media-packed column as the gas release proceeds. This allows for partial releases to consume only a proportional amount of media.

In contrast to wet-scrubbing systems currently available, the dry-scrubbing media provided herein requires little maintenance to yield high reliability. It is noted that the dry scrubbing media's efficiency is not directly dependent on how well the system is maintained.

Unlike wet-scrubbing systems currently available, the Emergency Gas Scrubber (EGS) does not require a mass transfer station or secondary containment. Advantageously, the dry-scrubbing media, quite unlike wet-scrubbing media, is not highly corrosive, toxic, hazardous and does not have a limited shelf-life.

Furthermore, it is also noted that currently available wet-scrubbing systems can be converted or retrofitted with the components of the dry-scrubbing media or EGS as disclosed herein, thereby providing enhanced capacity to capture or neutralize toxic gases such as chlorine and sulfur dioxide.

Other benefits of the compositions described herein include that the dry-scrubbing media is landfill disposable and does not require specialist disposal and costs associated therewith. The media is also non-toxic and non-hazardous before and after reaction or usage. The dry-scrubbing media operates effectively at low atmospheric temperatures for example, −400° Fahrenheit. The dry-scrubbing media, while having enhanced chlorine and sulfur dioxide removal capacity over media known and currently used in the art, also allows retro-fitting of wet-scrubbing systems with the dry-scrubbing media resulting in enhanced chlorine or sulfur dioxide removal.

Wet scrubbing of effluent streams involves contacting the effluent gas from a specific process with a scrubbing liquid to cause undesired effluent stream components to be absorbed by the liquid, or to react with the liquid (e.g., a caustic solution for contacting with an acid gas effluent) to effect the removal of the undesired components from the gas phase. Often the scrubbing liquid includes an oxidizing agent such as potassium permanganate, a regulated substance, or sodium hypochlorite, which leads to unwanted precipitation reactions. Further, the wet scrubbing system requires the consumption of significant amounts of the oxidizing agents and leads to a contaminated aqueous waste stream.

In contrast, a dry-scrubbing media involves contacting an effluent gas stream with a solid material which functions to chemisorb or react with the undesired components to effect their removal. The dry-scrubbing media described herein concentrates and fully contains hazardous contaminants, is passive in operation, has no moving parts and works on demand, making it a safe and preferable mode of filtration and purification.

In one embodiment the dry-scrubbing media provides an adsorbent composition as a dry feed mix containing from about 40% to about 60% activated alumina and from about 40% to about 60% potassium carbonate by weight of the composition. It is believed that the alumina in the composition results in a more open pore structure containing "macropores." Such a structure is less likely to be clogged by the adsorbed compounds than activated carbon alone. This may explain why the instant composition has a greater adsorption capacity and efficiency than unimpregnated as well as impregnated activated carbons. Furthermore, the activated alumina supports the carbon, provides hardness even at very high surface areas, and increases the ignition temperature of the composition.

In another embodiment, the dry feed mix may optionally include activated carbon. In this instance, the dry feed mix contains about 20%-30% activated alumina, about 20%-30% potassium carbonate and about 40-60% activated carbon, all by weight of the composition.

In a further embodiment, the dry feed mix contains about 25% activated alumina, about 25% potassium carbonate and about 50% activated carbon, all by weight of the composition.

In another embodiment the dry feed mix contains about 40% to about 60% activated alumina and about 40% to about 60% potassium carbonate by weight of the composition can be optionally sprayed with a liquid or an impregnate. In one embodiment the liquid sprayed onto the dry mix is water. Generally, the amount of liquid applied to the dry feed mix is about 5% to about 30%. In another embodiment, the dry feed mix is sprayed with an impregnate, such as sodium thiosulfate. Generally, a 5% to about 20% solution of sodium thiosulfate is applied or sprayed onto the dry mix.

In another embodiment, an adsorbent composition is provided as a dry-scrubbing media in final form "ready for use". In one embodiment, the dry-scrubbing media may be directly applied to a column, filter bed, reaction chamber or an apparatus to create an Emergency Gas Scrubber or EGS. Generally, under such conditions, the adsorbent composition contains about 40% activated alumina, about 40% potassium carbonate and about 20% liquid, sprayed or applied during the dry-rolling or tumbling process so as to form nodules. In one embodiment the liquid applied during the manufacturing process is water.

In another embodiment wherein the dry-scrubbing media includes activated carbon, the dry-scrubbing media contains about 15-25% activated alumina, about 15-25% potassium carbonate, about 15-20% water and about 30%-55% activated carbon.

In a further embodiment the dry-scrubbing media contains activated alumina and potassium carbonate and can optionally include an impregnate such as sodium thiosulfate. Typically, about 5% to about 10% of the dry-scrubbing media by weight includes sodium thiosulfate.

Figure 3:
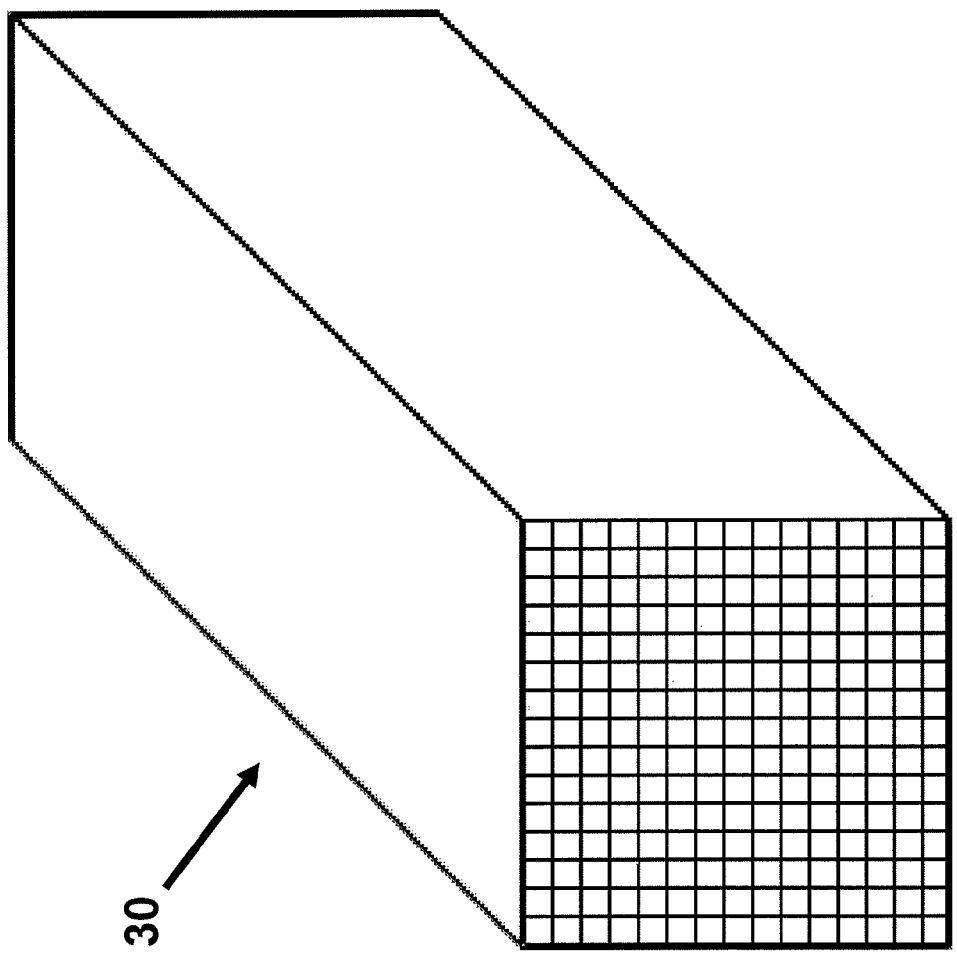
FIG. 3 is a drawing of the dry-scrubbing media in honeycomb matrix form.

In another embodiment, the dry-scrubbing media is prepared or manufactured by extrusion to form a solid structure. Extrusion is a manufacturing process used to create long objects of a fixed cross-sectional profile. A material, or mixture, is pushed and/or drawn through a die of the desired profile shape. The die may be of different shapes and diameters. Extrusion of the dry-scrubbing media provided herein can be performed by squeezing a mixture of activated alumina and potassium carbonate through a die using either mechanical or hydraulic means. In one embodiment the dry-scrubbing media is prepared via extrusion to form a matrix or honeycomb structure or shape, shone in FIG. 3 containing multiple channels passing through the length of the extruded dry-scrubbing media 30. The honeycomb has a matrix of porous walls, composed of the dry-scrubbing media, forming a multiplicity of cells extending from one end (proximal) to another end (distal) of the honeycomb (see FIG. 3). One advantage of dry-scrubbing media prepared via extrusion is that the matrix or honeycomb provides a greater surface area for chemical reactions to take place between contaminants in an air-stream and the dry-scrubbing media. In one embodiment, the dry-scrubbing media produced under extrusion is composed of activated alumina and potassium carbonate. In another embodiment, the extruded dry-scrubbing media may further include activated carbon. In another embodiment, the dry-scrubbing media produced by extrusion to form a matrix or honeycomb may further include impregnates, such as sodium thiosulfate. Impregnates can be applied to the dry-scrubbing media before, during, or after extrusion. It is to be understood that the process of extrusion is well known in the art, and that any means of extrusion including but not limited to, cold extrusion and hot extrusion, are encompassed herein. Furthermore, additives such as colorants and UV inhibitors (in either liquid or pellet form) are often used and can be mixed with the activated alumina and potassium carbonate mixture prior to extrusion. Plasticity and shape retention of extruded materials can be varied or improved through the use of binders. The binder is not particularly limited and there may be used any of various types of binders which is used when a molded product is made by extrusion molding or injection molding. More specifically, there are exemplified various types of alcohols, celluloses such as methyl cellulose, ethyl cellulose etc., starches, vinyl resins, various waxes, thermoplastic polyolefins such as polyethylene, polypropylene etc., polyacetate vinyl compounds etc. In one embodiment, binders include but are not limited to, starch adhesives, organic binders, clay, and feldspar.

While not wishing to be bound by the following theory it is believed that the honeycomb or matrix structure produced by extrusion allows for the formation of pores or channels in the solid structure resulting in an increase in total surface area available for chemical interaction with contaminants.

In another embodiment, a system for forming powderized or granulated dry-scrubbing media products of higher density, with less dust, better granularity and better flow characteristics than currently available media is provided. A system is provided for pelletizing the dry-scrubbing media, and thereafter subjecting the pellets to a milling process to obtain a powdered form. During pelletizing, steam can be added. The resulting powder is denser, more granular and has better free flow properties than the pre-pelletized material. The powderized dry-scrubbing media can be used in a reaction chamber or column.

It is to be understood that one of ordinary skill in the art may develop or modify the dry-scrubbing media described herein in addition to the pelletization and extrusion methods discussed above. Indeed, it is envisaged that the dry-scrubbing media may have any suitable size, shape and conformation appropriate to the end use application and the removal of contaminants, such as chlorine and sulfur dioxide from gas or air-streams. The dry-scrubbing media may further include active ingredients and inactive ingredients, and may be in a finely divided form, e.g., beads, spheres, rings, toroidal shapes, irregular shapes, rods, cylinders, flakes, films, cubes, polygonal geometric shapes, sheets, coils, helices, meshes, granules, pellets, powders, particulates, extrudates, honeycomb matrix, composites (of the dry-scrubbing media with other components), or crushed forms of the foregoing conformations.

In one embodiment, the dry-scrubbing media for chlorine gas removal is at least 10% minimum by weight. For example, 100 lbs of dry-scrubbing media removes at least 10 lbs of chlorine.

In a further embodiment, the dry-scrubbing media for chlorine gas removal is about 15% minimum by weight. For example, 100 lbs of dry-scrubbing media removes at about 15 lbs of chlorine.

In another embodiment, the dry-scrubbing media for chlorine gas removal is about 20% minimum by weight. For example, 100 lbs of dry-scrubbing media removes at about 20 lbs of chlorine.

In yet another embodiment, the dry-scrubbing media for chlorine gas removal is at least 25% minimum by weight. For example, 100 lbs of dry-scrubbing media removes at least 25 lbs of chlorine.

In another embodiment, the composition is capable of rapidly absorbing about 1-ton of chlorine, for example after a chemical spillage. In this instance, the dry-scrubbing media contained within, for example, an Emergency Gas Scrubber prevents contamination or release of toxic gases into the environment.

The adsorbent composition generally described as a dry-scrubbing media includes activated alumina and potassium carbonate. The dry-scrubbing media may further include water and activated carbon. Potassium carbonate is a low cost material that imparts strength to pellets of the composition cured at lower temperatures, thus saving fuel. It is believed that the potassium carbonate also reduces the flammability and may synergistically assist the chemical reactions involving compounds adsorbed by the composition.

The composition may preferably include an impregnate operative to cause inactivation of an undesirable substance in a air-stream passing over or through the composition. The impregnate preferably is a sulfate of a Group 1A metal. For example, activated alumina and potassium carbonate may be impregnated with sodium thiosulfate. The latter composition has a higher adsorption capacity and efficiency for removal of $Cl_2$ than activated carbon impregnated with either sodium bicarbonate or a mixture of sodium bicarbonate and KOH. A composition containing activated alumina, potassium carbonate and sodium thiosulfate was observed to have an enhanced ability to remove chlorine from an air-stream at lower atmospheric temperatures. While not wishing to be bound by the following theory, it is believed that the enhanced ability of a sodium thiosulfate-containing composition is based on the relative freezing temperature of potassium hydroxide. Sodium thiosulfate remains liquid at a lower atmospheric temperature than potassium hydroxide and can therefore continue to function effectively at a lower temperatures than a potassium hydroxide-containing composition.

Process of Making Dry-Scrubbing Media Compositions

A process for making a dry-scrubbing media composition is described herein. In one embodiment, a mixture of activated alumina, potassium carbonate and a liquid is formed into at least one cohesive unit, and the cohesive unit cured at an elevated temperature, preferably 100-225° Fahrenheit for at least one hour. Preferably, a dry feed mix is made of the activated alumina and potassium carbonate, and the dry feed mix is tumbled or rolled while being sprayed with a liquid, for example water. The dry feed mix may further include powdered activated carbon.

Heating the impregnating solution prior to rolling the pellets in a tumble mill appears to allow the pellets to begin curing immediately, yielding better physical characteristics than an impregnating solution applied at room temperature. This can be achieved using a solution temperature between about room temperature and the boiling point of the solution. The preferred solution temperature is about 50° Fahrenheit to about 200° Fahrenheit.

The combination of activated alumina, potassium carbonate and water may be carried out in any manner that effectively produces an adsorbent formed of a dry mix containing about 40% to about 60% by weight of activated alumina, and about 40% to about 60% by weight of potassium carbonate. Typically, 5% to 30% water should be contained by weight of the cured adsorbent product. The preferred amount of alumina in the dry mix is from about 40% to about 60% by weight, while the most preferred amount is about 50% by weight. The preferred amount of potassium is from about 40% to about 60% by weight, while the most preferred amount is about 50% by weight. In a preferred embodiment, the final product contains from about 5% to about 20% by weight of water.

The amount of moisture present in the composition will depend on several factors, related primarily to the characteristics of the activated alumina being treated. The desired moisture content of the composition is readily obtained by spraying the dry mix ingredients while they roll on the mixer, in accordance with the method of U.S. Pat. No. 3,226,332.

The combination of activated carbon powder with activated alumina and potassium carbonate similarly may be carried out in any manner that effectively combines a dry mix containing about 20% to about 30% by weight of potassium carbonate; about 40% to about 60% by weight of activated carbon powder; and about 20% to about 30% by weight of activated alumina.

In another embodiment the dry feed mix contains about 25% by weight activated alumina, about 25% by weight potassium carbonate and about 50% by weight activated carbon powder.

The combination of activated carbon powder with activated alumina, potassium carbonate and water similarly may be carried out in any manner which effectively combines about 15% to about 25% by weight of potassium carbonate; about 30% to about 55% by weight of activated carbon powder, about 15% to about 25% by weight of activated alumina; and about 15% to about 20% water.

Impregnation of either of the above combinations may be carried out in any manner which effectively produces an adsorbent of about 0.1% to about 15% by weight of impregnate formed by using a solution of about 0.3% to about 40% impregnate. Impregnation may be carried out simply by soaking the combinations in one volume of impregnate solution. The time required to produce the desired impregnation level is dependent upon the impregnate employed, and will only be as much time as is needed for the impregnate to penetrate the combinations. Additionally, the impregnate solution may be heated prior to use, for example during preparation of a dry-mix or during a tumbling/rolling process.

In one embodiment, impregnation with sodium thiosulfate may be carried out by using a solution of about 3% to about 20% sodium thiosulfate. The resulting pellet should contain from about 1% to about 10% by weight of sodium thiosulfate. Impregnation with other suitable impregnates also may be carried out in any manner that effectively produces an adsorbent of about 1% to about 10% by weight of impregnate, formed by using a solution of up to about 40% impregnate.

Other methods of impregnating the dry-scrubbing media will suggest themselves as equally appropriate and these are included within the scope of the present invention. For example, the impregnate solution may be passed through the media rather than being used in a static immersion treatment. However, it has been found that a preferred method of impregnation is "spray addition" in which an impregnate solution is sprayed onto the dry combination being tumbled in a mixer. This method of impregnation has been described in U.S. Pat. No. 3,226,332.

Additionally, as mentioned above, the dry-scrubbing media may be formed by extrusion to form a matrix or honeycomb structure. The formation of channels and pores in a matrix creates a large surface area for chemical reactions to occur between contaminants in an air-stream and the surface of the dry-scrubbing media.

Pellets of dry-scrubbing media can be manufactured using standard equipment known in the preparation of pelletized products. Several manufacturers are known to one of ordinary skill in the art and such equipment is used in a wide array of industries. The advantages associated with a pelletized material include control of dust. The control of dust is important in the present method because an air-stream must pass through the dry-scrubbing media. If the dry-scrubbing media becomes clogged due to dust, this may impact the level or efficacy of chemical reactions occurring between contaminants and the dry-scrubbing media.

To process pellets, activated alumina and potassium carbonate can be fed at a constant rate onto a rotating disk that is oriented at an adjustable angle above horizontal. As the disk rotates, a liquid binder is sprayed onto the surface of the powder, and the combined materials are caused to tumble down the face of the disk, thus producing rolled pellets. The pellets roll from the lower end of the disk as new powder and binder are added at the upper end of the disk. In preferred aspects, the disk is a granulating pan, and is provided with at least one scraper, and is tilted at an angle of from 10°-80° from the vertical. More preferably, the method further includes sizing the pellets by passing the pellets through a sieve.

Methods of Use

A method of removing impurities from air or gas stream is provided. In accordance with the method, the dry-scrubbing media composition described above is contacted with an air-stream containing impurities to be removed. The dry-scrubbing media is particularly useful for the removal of $Cl_2$ and $SO_2$ from an air-stream. At some levels of removal efficiency, pellets embodying the composition will last over 50% longer than activated carbon impregnated with sodium hydroxide, and will provide better removal efficiency. The dry-scrubbing media described herein is also useful for removing $H_2S$ gas and hydrocarbons from air-streams.

The dry-scrubbing media compositions may be particularly useful for the reduction or prevention of the release of toxic gaseous compounds from at least the following locations: water disinfection systems, municipal waste treatment facilities, petrochemical refining plants, swimming pools, hospitals, hotel facilities, petroleum storage areas, refineries, water treatment systems, sewage treatment facilities, hospital morgues, animal rooms, pulp and paper production sites, and the like.

The concentration of these undesirable compounds in the air-stream is not considered critical to the process, and concentrations resulting in levels as low as less than five parts per billion (ppb) at discharge of the compounds passing through the dry-scrubbing media can be achieved.

The physical and chemical makeup of the air-stream from which it is desired to remove undesirable compositions is not critical. It may be important that oxidizing conditions prevail but it is not known to what extent oxidation may affect the purification achieved. Typically, the undesired compositions will be removed from air, especially from air admixed with effluent gas streams. The oxidizing conditions that may be important are generally that oxygen be present in the air-stream being treated, at least in small amounts. If oxygen is totally absent or present in insufficient amounts, oxygen may be independently introduced into the air-stream being treated. A number of factors affect the amount of oxygen that may be required for maximum adsorption in accordance with the present method, including the concentration and absolute amount of compounds being adsorbed from the air-stream being treated.

With respect to the amount of compound adsorbed, it is recognized that the following factors affect the process: the basic degree of attraction of activated alumina and potassium carbonate for the compound; the pore structure and size of the activated alumina, the specific surface area of the activated alumina; and the surface characteristics of the activated alumina. In embodiments containing dry-scrubbing media and activated carbon, specific surface area and surface characteristics of activated carbon can effect the amount of compound or contaminant absorbed.

The impregnation treatment of the activated starting material in accordance with the present method has not been found to be critical with respect to the particular sequence in which the dry scrubbing media is impregnated with moisture and impregnates.

The dry-scrubbing media composition is appropriately used alone in columns or Emergency Gas Scrubbers (EGS) for the removal of undesirable compounds. It is also appropriate, however, to use the dry-scrubbing media in conjunction with columns containing other adsorbents. Such combination is especially appropriate when high levels of contaminants or hydrocarbons are present in the air-stream. Any such column may be placed either upstream (before the dry-scrubbing media with respect to the effluent gas or air stream being treated) or downstream.

It has also been found that flow rates of the gas stream being treated with the dry-scrubbing media do not affect the breakthrough capacities of the dry-scrubbing media. However, a preferred flow rate is between 10 and 750 ft/min, and most preferably is between 50 and 150 ft/min.

The following examples will serve better to illustrate the composition and the treatment methods and the adsorption capacity produced thereby. Reference is made to a tumble mill in the following examples. Such reference is to a small scale rolling disc used in a laboratory setting. The disc is 14" in diameter with a depth of 4". The disc is angled at 30° from the vertical, and operated at a speed of 20 rpm. By comparison, a full scale production disc is typically 6 feet in diameter with a depth of 4", and is operated at the same angle and the same speed. The laboratory conditions yield pellets that are approximately the same size as the full scale disc, but not as strong, because the periphery of the disc moves at a slower speed. Thus, the pellets do not experience the same amount of force during rolling. Therefore, it is expected that pellets formed on a full scale disc using the same starting materials as described in the following examples would be stronger, and would perform better than as indicated in the examples. It should be noted that the continuous flow systems described in several of the following examples all were operated in a relative humidity of 40-50%.

The present invention is further illustrated by the following examples, which are not to be construed in any way as imposing limitations upon the scope thereof. On the contrary, it is to be clearly understood that resort may be had to various other embodiments, modifications, and equivalents thereof, which, after reading the description herein, may suggest themselves to those skilled in the art without departing from the spirit of the present invention.

EXAMPLE 1

A dry-feed mix was prepared by combining, by weight, 25% activated alumina, 25% potassium carbonate and 50% activated carbon powder.

EXAMPLE 2

A dry-scrubbing media was prepared by combining, by weight, 40% activated alumina, 40% potassium carbonate and sprayed with 20% water at 200° F. while the dry feed mix was tumbled in a tumble mill. The resulting pellets were then dried at 135-140° F. in air, relative humidity at about 35%, until the pellets contained about 10% by weight of moisture.

EXAMPLE 3

A dry-scrubbing media was prepared by combining, by weight, 20% activated alumina, 20% potassium carbonate, 40% activated carbon powder and 20% water. The mix was sprayed with a 15% sodium thiosulfate aqueous solution at 200° F. while the dry feed mix was tumbled in a tumble mill. The resulting pellets were then dried at 135-140° F. in air, relative humidity at about 35%, until the pellets contained about 5% to about 10% by weight of sodium thiosulfate.

EXAMPLE 4

A dry-scrubbing media was prepared by combining, by weight, 25% activated alumina, 25% potassium carbonate and 50% activated carbon powder. The dry feed mix was sprayed with a 15% sodium thiosulfate aqueous solution at 200° F. while the dry feed mix was tumbled in a tumble mill. The resulting pellets were then dried at 135-140° F. in air, relative humidity at about 35%, until the pellets contained about 5% to about 10% by weight of sodium thiosulfate.

EXAMPLE 5

Adsorbent compositions as described in the foregoing examples were subjected to a bulk crush test and an abrasion test. The bulk crush test measures strength by determining the percentage of a sample remaining uncrushed after subjecting the sample to a pressure of 200 pounds for one minute. The optimum rating is 35-45%. The abrasion test measures the degrees to which the pellets release dust. The optimum rating is under 6%. The test results are shown below.

Crush Strength: 35%-70% Maximum
Abrasion: 4.5 Maximum

The dry scrubbing media possessed the following physical properties:

Bulk Density: 45 lbs/ft$^3$ (0.72 g/cc)±5%
Nominal Pellet Diameter: ⅛" (3.2 mm)

While this invention has been described in detail with regard to preferred embodiments thereof, it should be understood that variations and modifications can be made without departing from the spirit and scope of the invention as defined in the following claims.

What is claimed is:

1. A dry-scrubbing media composition comprising about 20% to 30% by weight activated alumina, about 40% to 60% by weight activated carbon and 20% to 30% by weight potassium carbonate.

2. The composition of claim 1, further comprising a sulfate of a Group IA metal.

3. The composition of claim 2, wherein the sulfate is sodium thiosulfate.

4. A dry-scrubbing media composition comprising:
(a) about 25% by weight of activated alumina;
(b) about 50% by weight activated carbon; and,
(c) about 25% by weight potassium carbonate.

5. The composition of claim 4, further comprising about 5% to about 10% by weight of sodium thiosulfate.

6. A method for preventing or reducing release of a contaminant from an air-stream comprising administering a dry-scrubbing media composition comprising about 20% to 30% by weight activated alumina, about 40% to 60% by weight activated carbon and 20% to 30% by weight potassium carbonate to an air-stream, wherein the dry-scrubbing media is effective to remove the contaminant from the air stream.

7. The method of claim 6, wherein the contaminant is chlorine or sulfur dioxide.

8. The method of claim 6, wherein the dry-scrubbing media further comprises a sulfate of a Group IA metal.

9. The method of claim 8, wherein the sulfate is sodium thiosulfate.

10. The method of claim 6, wherein the dry-scrubbing media composition comprises about 25% by weight of activated alumina, about 50% by weight activated carbon and about 25% by weight potassium carbonate.

11. The method of claim 10, wherein the dry-scrubbing media composition further comprises from about 5% to about 10% by weight of sodium thiosulfate.

12. The method of claim 6, wherein the dry-scrubbing media composition is in the form of a matrix or honeycomb structure with long open channels.

13. The method of claim 6, wherein the dry-scrubbing media composition is contained within a reaction chamber.

14. An apparatus for removing a contaminant from an air-stream comprising a dry-scrubbing media and a reaction chamber;
wherein the dry scrubbing media comprises about 20% to 30% by weight activated alumina, about 40% to 60% by weight activated carbon and 20% to 30% by weight potassium carbonate.

15. The apparatus of claim 14, wherein the contaminant comprises chlorine or sulfur dioxide.

16. The apparatus of claim 14, wherein the dry scrubbing media further comprises sodium thiosulfate.

17. The apparatus of claim 16, wherein the amount of sodium thiosulfate is about 5% to about 10% by weight.

\* \* \* \* \*